United States Patent [19]

Schulein, Jr. et al.

[11] Patent Number: 5,121,712

[45] Date of Patent: Jun. 16, 1992

[54] ANIMAL LITTER BOX LINER

[75] Inventors: Benjamin M. Schulein, Jr., St. Louis, Mo.; Joan E. Polsen, Dobbs Ferry, N.Y.

[73] Assignee: Alfa-Pet, Inc., St. Louis, Mo.

[21] Appl. No.: 724,601

[22] Filed: Jul. 2, 1991

[51] Int. Cl.⁵ .............................................. A01K 29/00
[52] U.S. Cl. ................................................... 119/167
[58] Field of Search .................. 119/167, 170; 383/38, 383/40

[56] References Cited

U.S. PATENT DOCUMENTS

| | | | |
|---|---|---|---|
| 2,015,119 | 9/1935 | McEwen | 383/40 |
| 2,654,527 | 10/1953 | Geckler et al. | 383/40 |
| 2,761,481 | 9/1956 | Boatwright | 383/40 X |
| 3,394,870 | 7/1968 | Curtis | 383/40 X |
| 3,809,013 | 5/1974 | Rigney et al. | 119/167 |
| 4,279,217 | 7/1981 | Behringer | 119/170 |
| 4,784,082 | 11/1988 | Wolfe | 119/167 |
| 4,870,924 | 10/1989 | Wolfe | 119/167 |
| 4,993,845 | 2/1991 | Faltyner | 383/40 |
| 5,031,578 | 7/1991 | Hammons et al. | 119/167 |

Primary Examiner—Gene Mancene
Assistant Examiner—Thomas Price
Attorney, Agent, or Firm—Kalish & Gilster

[57] ABSTRACT

An animal litter box liner of flexible, sheet-like material is provided with holes of an appropriate size and location for allowing clean, dry litter to sift therethrough while simultaneously retaining clumps of urine-soiled litter and feces within the liner as it is lifted from a litter pan.

17 Claims, 3 Drawing Sheets

ANIMAL LITTER BOX LINER

BACKGROUND OF THE INVENTION

1. Field of Invention

This invention relates, in general, to the field of animal litter box liners and, more specifically, to a perforated liner for animal litter boxes, which liner is to be used in combination with a type of litter which forms clumps when moistened.

2. Description of the Prior Art

It is axiomatic that animals maintained exclusively indoors, most often (and for convenience referred to as) cats, require a litter box for purposes of urination and defecation. Known litter boxes consist of plastic or waxed cardboard pans, trays, or the like, sometimes accompanied by a liner such as a plastic bag or sheeting. Unlined cardboard litter trays obviously have a very limited life span in that they become urine soaked quite rapidly Unlined plastic pans and plastic or cardboard trays having plastic liners have a more extended life, but still entail other drawbacks.

Negative aspects of conventional litter boxes include the following:

Pouring large amounts of litter (for example, five to ten pounds per litter box) from a bag into the cat litter box or from the litter box into a waste receptacle necessarily introduces a large amount of clay dust into the local atmosphere. Moreover, when such usual litter pan arrangements are filled with conventional ground clay litter, generally having a grain diameter of up to approximately one-half centimeter, the user cat's urine will drain quickly to the bottom of the pan where it sits and only slowly absorbs into the litter. Thus a strong ammonia odor is necessarily released to the general whereabouts, often despite the addition of so-called odor-reducing granuals.

Unlined pans thus require frequent dumping and rinsing to reduce the urine odor in the home. Although lined pans do not usually have to be rinsed, they nevertheless must be changed frequently. Thus, with known cat litter boxes a great deal of the usual ground clay litter is wasted as relatively clean litter is discarded along with that which is soiled.

A new type of cat litter is currently available and widely marketed under the trademarks or trade names of, for example, NATURAL SELECT, SUPER SAND, and SCOOP AWAY (NATURAL SELECT is a registered trademark of Absorben Clay Products, SUPER SAND is a registered trademark of Chip's Pet Products, Inc. and SCOOP AWAY is a registered trademark of A & M Pet Products, Inc.). The clay in this new type of litter is ground very finely, to a grain diameter much like sand, of approximately one to two millimeters, and is formed in part of Wyoming bentonite or attapulgite clay in addition to a proportion of the usual type of clay used in litter preparations.

This new type of litter has the advantage that it forms large hard clumps of approximately 1 to 2 inches in diameter when in contact with cat urine (or other liquid). This new clumping litter therefore permits simple removal of the clumps by, for example, scooping them up with an appropriate tool and shaking off excess grains of clean litter, rather than discarding the entire boxful of litter in order to eliminate that which is soiled. This allows the clean litter which remains to be maintained in a nearly odor free state for an extended period of time relative to conventional non-clumping litters.

The new cat litter box liner described and claimed herein is designed specifically for use with this new type of clump forming litter.

SUMMARY OF THE INVENTION

Thus, it is among the several objects of the present invention to provide a cat litter box liner for use with the above-referenced clumping cat litter, which liner is provided with perforations in the generally central portion thereof for allowing sifting from the liner of clean, dry litter while retaining relatively large clumps of urine soiled litter within the liner for facile disposal thereof.

It is further among the objects of the present invention to provide a cat litter box liner which will permit the consumer to use less cat litter and simultaneously introduce less soiled litter into landfills and sewer systems as waste.

It is also among the objects of the present invention that the subject liner be constructed of a material, such as certain known plastics having a corn starch base, which will subsequently degrade upon exposure to appropriate environmental conditions as, for example, those present in a landfill, faster than other plastics.

It is still further among the objects of the present invention to provide a means for waste litter removal from a cat litter box which introduces very little dust into the surrounding air.

Also among the objects of the present invention is that the subject litter box liner provide a relatively economical and time-saving means for maintaining a cat litter box which is substantially free of unpleasant odors.

Accordingly, in furtherance of the above objects, the present invention is, briefly, an animal litter box liner which is constructed of a flexible, sheet-like material having a thickness, and further having an area provided with dimensions sufficient to permit lining of an entire inside of a litter box. The litter box liner has a plurality of spaced-apart perforations through the thickness of the flexible material approximately centrally within the area thereof.

The present invention is also, briefly, for use in combination with finely ground litter which forms clumps upon exposure to moisture to thereby permit sifting of dry litter from the liner into the litter box while retaining clumps of urine-soiled litter within the liner when it is lifted above the litter box.

The present invention may also, briefly, be provided with a pocket sealed in part to the flexible, sheet-like material within the liner area and opening centrally thereon for retaining clumps of soiled litter without loss of small bits of litter from the liner.

Other objects will be in part apparent and in part pointed out hereinbelow.

The present invention is also, briefly, an animal litter box liner consisting of flexible, sheet-like material having a bottom edge interacting a continuous side wall and having dimensions at least sufficient to permit lining the entire bottom surface and inside walls of a litter box used with the liner. There are a plurality of spaced-apart perforations through the continuous side wall adjacent the bottom edge of the liner, and the liner is constructed in the form of a rectangular envelope having a seam along the bottom edge. The plurality of perforations is disposed one-half to each side of the seam so as to substantially overlay each other when the liner is in closed position and so as to be centrally located over the bottom surface of the litter box when the liner is in open, operable position with the seam disposed centrally and longitudinally upon the litter box bottom surface.

Moreover, the present invention includes, briefly, an animal litter box liner formed of flexible, sheet-like material having dimensions at least sufficient to permit lining the entire inside of a litter box, and having a plurality of spaced-apart perforations through the liner approximately centrally within the area thereof. The liner is provided with a pocket having three edges thereof sealed to the liner and also has an open edge facing the perforations to thereby provide a receptacle for retention of waste material within the pocket for neatly transferring urine-soiled litter form the litter box without inadvertent loss of small bits of litter from the liner.

Further, the present invention includes, briefly, a one-piece liner for use in lining an animal litter box with a bottom surface and continuous upstanding side walls which extend in a substantially vertical direction. The liner consists of a thin sheet of flexible material with a continuous outer edge that defines an area of certain predetermined dimensions sufficient to permit complete overlayering of the bottom surface and side walls of the litter box. The liner is provided with a plurality of uniformly spaced-apart, non-closeable perforations of preselected size which are sufficiently inward of the outer edge of the liner so as to be disposed overlyingly of the bottom surface of the box when the liner is in operative position therein. This permits simultaneous retention of soiled litter and excrement on the liner and also permits passage through the non-closeable perforations of dry, non-soiled litter into the litter box when the liner is gently lifted thereabove.

DESCRIPTION OF THE PREFERRED EMBODIMENT OF THE INVENTION

Figure 1:
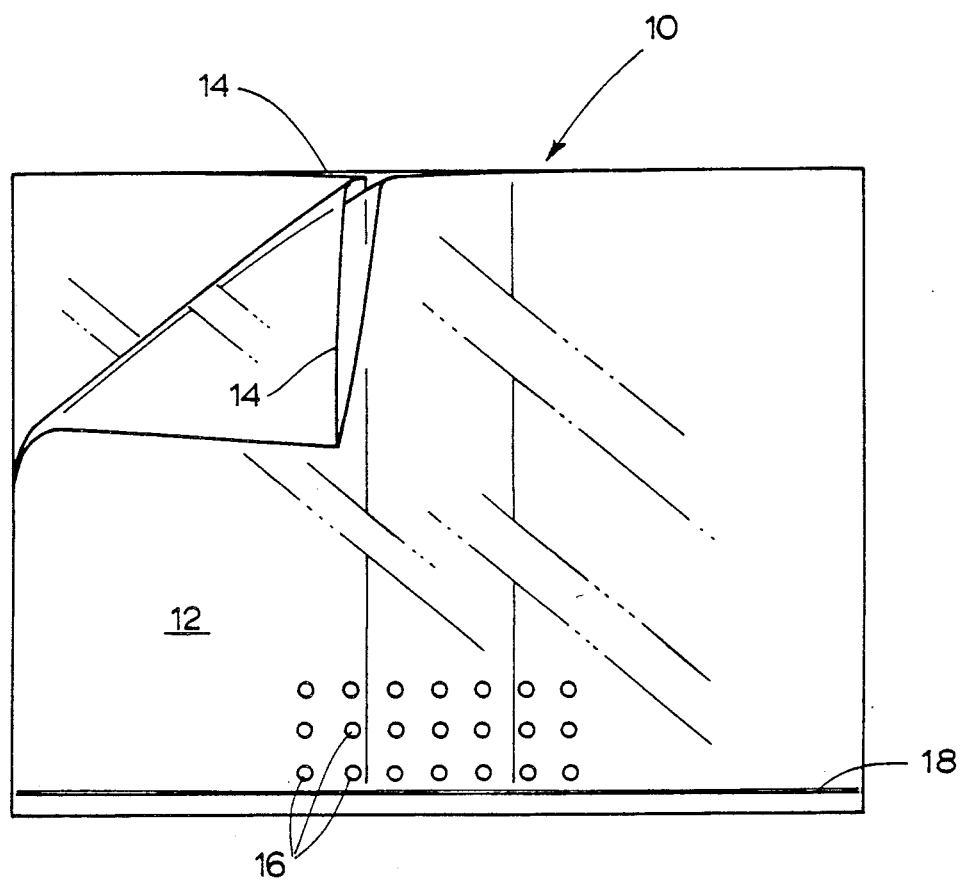
FIG. 1 is an elevation view of a litter box liner constructed in accordance with and embodying the present invention and shown in folded position.
Figure 2:
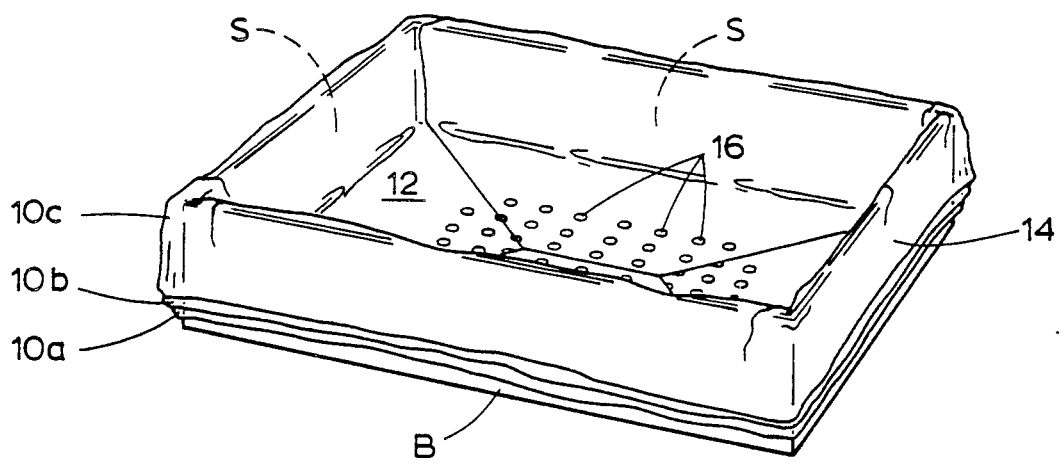
FIG. 2 is a perspective view of a plurality of the litter box liners of FIG. 1 in open, layered position within a cat litter box.
Figure 3:
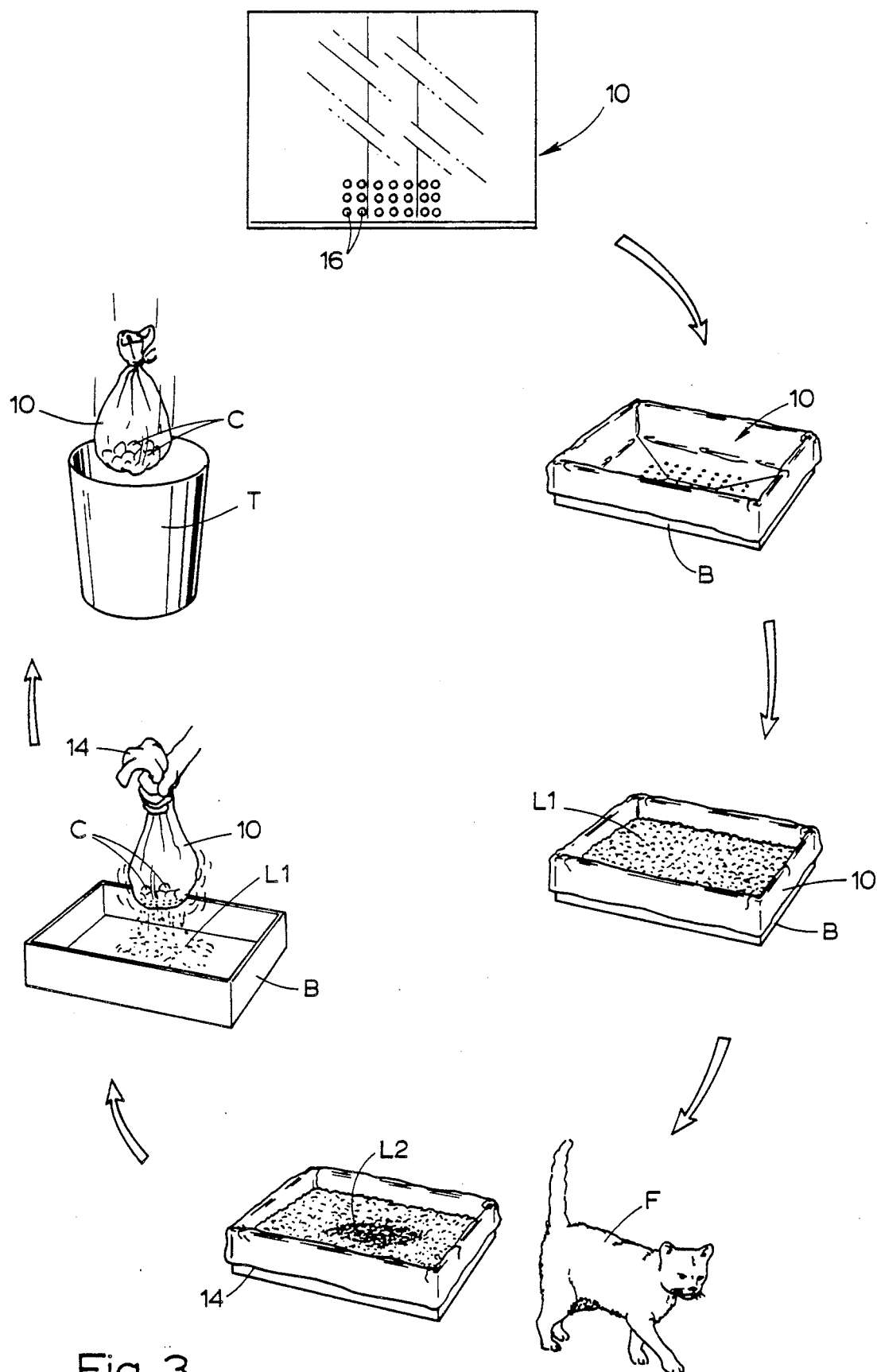
FIG. 3 is a flow chart illustrating an example of the intended use of the litter box liner of FIG. 1.

Referring to the drawings, illustrated in FIGS. 1 through 3 and generally designated 10 is one variation of an animal litter box liner constructed in accordance with and embodying the present invention.

Cat litter box liner 10 is composed of a flexible, sheet-like material having a body portion 12 and an outer edge 14. It is preferred that the flexible material of liner 10 be a thin, biodegradable, waterproof plastic sheet-like material, such as that which is commonly used for items such as grocery bags. However, a heavier plastic or other flexible material which is not necessarily easily biodegradable can be used effectively.

A particularly inventive feature of cat box liner 10 is the provision of a plurality of holes 16 perforating body 12 and located approximately centrally within the area thereof. It is preferred that holes 16 be of three-eighths inch in diameter and arranged in a series of rows and columns having approximately one inch between the centers of adjacent holes.

FIG. 1 illustrates one embodiment of liner 10, showing the same to be constructed as a shallow, wide bag or envelope having a seam 18 at the bottom edge thereof. Three rows and seven columns of holes 16 are arranged on each side of seam 18, with the rows being parallel to the seam. Other arrangements and numbers of perforations 16 can be used with adequate success.

Holes 16 can be greater or smaller in diameter than the preferred three-eighths inch. However, it has been found that diameters less than one-eighth inch are not satisfactory in that the flow of clean litter from liner 10 is impeded thereby. Diameters as large as or greater than one-half inch are somewhat too large because smaller lumps of soiled litter can fall through and remain with the clean litter in the box.

FIG. 2 illustrates an example of use of liner 10 involving layering multiple liners 10 for example, 10a, 10b, 10c, one within another within box B. Even fifteen such liners 10, or perhaps more, may be so interlacing prior to filling the innermost liner, such as 10c, within box B with clumping-type cat box litter such as that previously described.

Accordingly, it is anticipated that for the convenience of the ultimate consumer the manufacturer may market a plurality of liners 10 already so interlacing within a given package. Thus the user can be relieved of the task of unfolding and layering a multiplicity of the fine plastic film or sheet-like liners 10. It can be readily seen that for persons having, for example, vision problems or arthritis afflictions this feature may be of great benefit.

FIG. 3 is a flow chart illustrating a method of use of liner 10. For clarity, only one such liner 10 is illustrated in box B. Thus, following the chart clockwise from the top of FIG. 3, a liner 10 is placed in box B and filled with clean litter L1. After use by cat F for urination soiled litter L2 will necessarily have some odor of ammonia. Thus, in order to freshen litter box B the outer edges 14 of liner 10 are gathered up and gently shaken just above box B. Clumps C of soiled litter L2 are retained in liner 10 as clean litter L1 gently sifts through perforations 16 back into box B, creating only a minimum of dust. Thereafter, liner 10 may be discarded along with clumps C contained therein as into a trash can T or other waste receptacle. Of course, any solid feces also in litter L2 will be simultaneously removed with clumps C.

It may be seen that if liner 10 is used such as illustrated in FIG. 2, in interlacing fashion, removal of an uppermost liner, such as 10c, would necessarily leave litter L1 in the next liner, such as 10b. After removal of the final liner, for example as shown in FIG. 3, the remaining clean, dry litter L1 may be subsequently freshened by use of a slotted spoon or the like, or by merely pouring out and discarding what little litter L1 remains in the bottom of the box and replacing it with a new batch or series of liners and fresh litter.

As shown hereafter, it may be seen that liner 10 does not necessarily have to be constructed as an envelope as shown in FIG. 1, but may also provide the intended function as a seamless bag or even as a single large sheet of various shapes if the dimensions thereof are great enough to permit the user to fully line box B, as shown in FIG. 2, such that outer edge 14 preferably overlaps the sidewalls S of box B.

Figure 4:
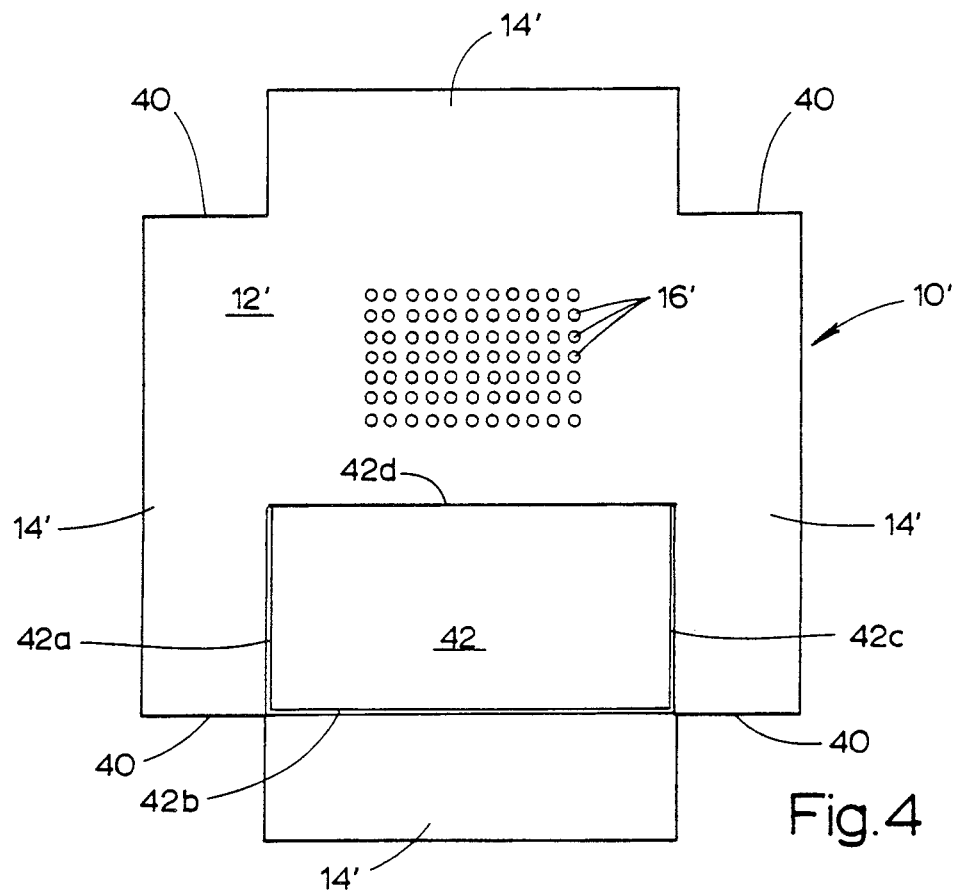
FIG. 4 is a top plan view of a variation of the litter box liner constructed in accordance with and embodying the present invention in open position.

FIG. 4 illustrates a particularly preferred embodiment of the litter box liner of the present invention, generally designated 10'. Like parts are labeled with like numbers relative to those shown in the embodiment designated 10 in FIG. 1. Liner 10a is also constructed of flexible, sheet-like material having a body or area portion 12' surrounded by an outer edge 14' and penetrated by holes 16'.

Rather than being formed as an envelope, as is the embodiment shown in FIG. 1, liner 10' is constructed substantially in the form of a cross, that is, as a rectangle of flexible, sheet-like material having dimensions of, for example, 36 by 32 inches with four six inch by six inch squares removed to form corner cutout portions 40.

Given the dimensions in the above pocket-bearing embodiment, it is preferred that perforations 16' be arranged in seven rows and eleven columns so as to be 77 in number. Moreover, it is preferred that such an arrangement of holes 16' be positioned substantially to one side of a central longitudinal axis of liner 10'.

In such an arrangement the outermost row of perforations 16' is approximately ten inches from the closest parallel edge 14' and each outermost column of perforations 16' is approximately eleven inches from the closest parallel edge 14'.

On the opposite side of the center of the length of liner 10' relative to holes 16', is positioned a rectangular pocket 42 preferably formed of the flexible, sheet-like material previously described in regard to liner 10 and heat sealed, or attached by other sealing means, to body 12' along edges 42a, 42b, 42c. Pocket 42 is left open, unattached in relation to body 12' along edge 42d which is parallel and adjacent to the innermost row of holes 16', and approximately four inches therefrom.

As shown, pocket 42 is substantially rectangular in shape, approximately ten inches deep and twenty inches wide, although it could certainly still be functional if formed of a different overall shape and if attached by other methods, for example by gluing.

If formed as shown FIG. 4, with corner cutouts 40, liner 10' conveniently fits into and folds over at the edges of a conventional rectangular litter box, such as that shown in FIG. 2 and designated B. However, other functional variations are anticipated, for example, rectangular with pocket but without corner cutouts; oval with oval pocket, rectangular with oval pocket, and so on; or with a different arrangement or size of perforations 16'.

In use, soiled litter and feces can be removed from a litter box lined with liner 10' by carefully lifting edges 14' and folding same upward while simultaneously shifting the material within the liner to one side of center so as to be above holes 16'. In this position, clean, dry litter of the clumping type previously discussed will gently sift through holes 16' while soiled or wet clumped litter and feces will be retained within liner 10'. After all or most clean litter has been allowed to sift from liner 10' back into the litter box, such as B, for continued use, the soiled litter clumps and feces can be neatly retained in the liner 10' for discarding by allowing such materials to carefully roll or shift toward open edge 42d so as to be received by and retained within pocket 42. Such handling of litter waste within liner 10' avoids the potential problem of fine bits of litter being loosened and dropping off the larger clumps thereof which are to be discarded and sifting through holes 16', which latter creates the condition of leaving some debris along the floor or other surface between the litter box and the ultimate waste receptacle, such as trash can T shown in FIG. 3.

Figure 5:
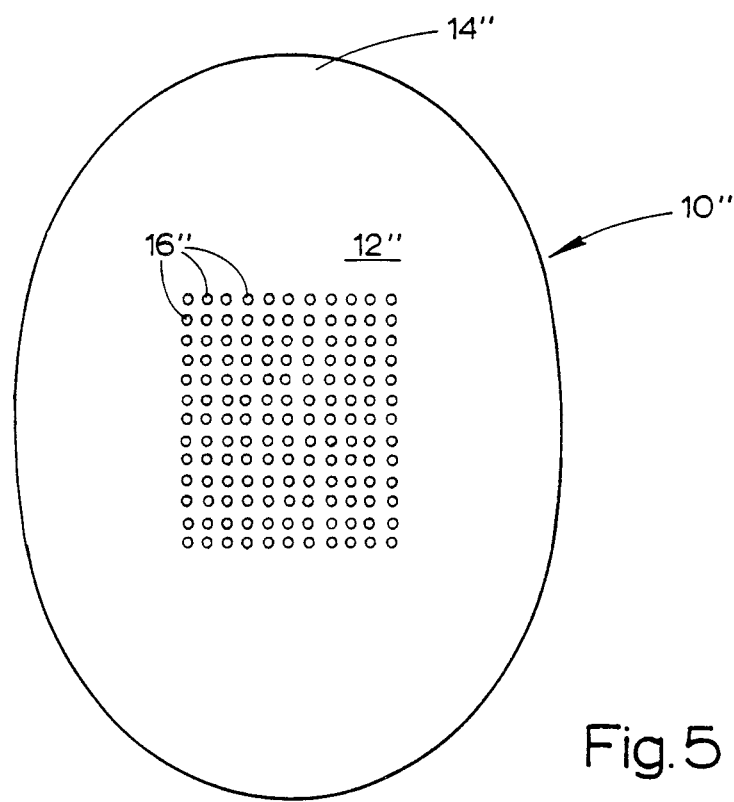
FIG. 5 is a plan view of a further variation of the litter box liner constructed in accordance with and embodying the present invention in open position.

FIG. 5 illustrates a further embodiment of a litter box liner of the present invention, generally designated 10", like parts bearing like numbers relative to the previous embodiments. Body 12" of liner 10" is provided with an oval shape and is surrounded by edge 14" Holes 16" of liner 10" are arranged in eleven rows and thirteen columns and are substantially centrally located in body 12'. As with both the previous embodiments, it is preferred that holes 16" have diameters of three-eighths inch and that they be spaced approximately one inch at the centers thereof.

Such a form of liner 10" as oval (or circular) is more readily adapted to an oval or circular litter box.

The embodiment of FIGS. 4 and 5 may also be used as described above in relation to FIGS. 2 and 3.

It is to be understood that the embodiments shown and discussed above, and the specific dimensions thereof, are merely examples of useful embodiments of the invention. Certainly, other acceptable dimensions are conceivable as are other materials and arrangements for holes 16, 16', 16".

Moreover, it is evident that liners 10, 10', 10" could also be used with conventional cat litter as a means for neatly removing feces therefrom. Such use however will not provide the advantage which is additionally obtained with the use of the above-mentioned clumping litter which permits the simultaneous removal of urine and its associated odor via clumps of litter from the box.

In view of the foregoing, it will be seen that the several objects of the invention are achieved and other advantages are attained Although the foregoing includes a description of the best mode contemplated for carrying out the invention, various modifications are contemplated.

As various modifications could be made in the constructions herein described and illustrated without departing from the scope of the invention, it is intended that all matter contained in the foregoing description or shown in the accompanying drawings shall be interpreted as illustrative rather than limiting.

What is claimed is:

1. An animal litter box liner for use with finely ground litter which forms clumps upon exposure to moisture, said litter box liner being comprised of a flexible, sheet-like material having a thickness and an area having dimensions sufficient to permit at least entirely lining an inside of a litter box, and having a plurality of spaced-apart perforations through the thickness of said liner approximately centrally within the area of said liner to thereby provide a means for sifting dry litter from said liner into the litter box while simultaneously retaining clumps of urine-soiled litter within said liner when said liner is lifted above the litter box.

2. The litter box liner of claim 1, wherein the flexible, sheet-like material of said liner is biodegradable.

3. The litter box liner of claim 1, wherein the flexible, sheet-like material of said liner is plastic.

4. The litter box liner of claim 1, wherein said plurality of perforations through the thickness of the flexible, sheet-like material of said liner are holes each having a diameter of three-eighths of an inch.

5. The litter box liner of claim 1, wherein a center of each of said perforation is approximately one inch from a center of any adjacent plurality of perforations.

6. The litter box liner of claim 1, wherein said plurality of liner is provided with 42 said perforations arranged in six rows and seven columns.

7. The litter box liner of claim 1, wherein the flexible, sheet-like material is constructed in the form of a rectangular envelope having a seam along a bottom edge thereof.

8. The litter box liner of claim 1, wherein said liner is comprised of seamless flexible, sheet-like material.

9. The litter box liner of claim 8, wherein said liner is substantially rectangular in shape.

10. The litter box liner of claim 8, wherein said liner is substantially oval in shape.

11. The litter box liner of claim 9, wherein corner portions of said liner have been removed so as to provide said liner with a substantially cross-like shape.

12. The litter box liner of claim 1, wherein said liner is provided with a pocket having an open edge facing said perforations for retention of waste material within said pocket for providing a means to thereby neatly transfer urine-soiled litter from the litter box to a waste receptacle without leaving small bits of litter on a floor surface between the litter box and the waste receptacle.

13. The litter box liner of claim 1, wherein said plurality of perforations provided substantially centrally of said liner are provided immediately to one side of a central longitudinal axis thereof.

14. The litter box liner of claim 13, wherein a pocket is provided within said liner area, said pocket having an open edge facing said perforations opposite the central longitudinal axis of said liner.

15. An animal litter box liner comprised of flexible, sheet-like material having a bottom edge intersecting a continuous side wall and having dimensions at least sufficient to permit lining the entire bottom surface and inside walls of a litter box used with said liner, and having a plurality of spaced-apart perforations through said liner continuous side wall adjacent the bottom edge of said liner, wherein said liner is constructed in the form of a rectangular envelope having a seam along the bottom edge, said plurality of perforations being disposed one-half to each side of the seam so as to substantially overlay each other when the liner is in closed position and so as to be centrally located over the bottom surface of the litter box when said liner is in open, operable position with the seam disposed centrally and longitudinally upon the litter box bottom surface.

16. An animal litter box liner comprised of flexible, sheet-like material having dimensions at least sufficient to permit lining the entire inside of a litter box, and having a plurality of spaced-apart perforations through said liner approximately centrally within the area thereof, wherein said liner is provided with a pocket having three edges thereof sealed to said liner and also having an open edge facing said perforations to thereby provide a receptacle for retention of waste material within said pocket for neatly transferring urine-soiled litter from the litter box without inadvertent loss of small bits of litter from said liner.

17. A one-piece liner for use in lining an animal litter box having a bottom surface and continuous upstanding side walls extending substantially vertically therefrom; said liner comprising of a thin sheet of flexible material having a continuous outer edge defining an area of certain predetermined dimensions sufficient to permit complete overlayering of the bottom surface and side walls of the litter box, and provided with a plurality of uniformly spaced-apart, non-closeable perforations of preselected size sufficiently inward of the outer edge of said liner so as to be disposed overlyingly of the bottom surface of the box when said liner is in operative position therein, to thereby permit simultaneous retention of soiled litter and excrement on said liner and to permit passage through said non-closeable perforations of dry, non-soiled litter into the litter box when said liner is gently lifted thereabove.

* * * * *

EX PARTE REEXAMINATION CERTIFICATE (6173rd)

United States Patent
Schulein, Jr. et al.

(10) Number: US 5,121,712 C1
(45) Certificate Issued: Apr. 8, 2008

(54) ANIMAL LITTER BOX LINER

(75) Inventors: Benjamin M. Schulein, Jr., St. Louis, MO (US); Joan E. Polsen, Dobbs Ferry, NY (US)

(73) Assignee: Alfa-Pet, Inc., St. Louis, MO (US)

Reexamination Request:
No. 90/005,076, Aug. 18, 1998

Reexamination Certificate for:
Patent No.: 5,121,712
Issued: Jun. 16, 1992
Appl. No.: 07/724,601
Filed: Jul. 2, 1991

(51) Int. Cl.
*A01K 29/00* (2006.01)

(52) U.S. Cl. .................................... 119/167
(58) Field of Classification Search ............ 119/165, 119/167–170; 383/38, 40
See application file for complete search history.

(56) References Cited

U.S. PATENT DOCUMENTS

| | | | |
|---|---|---|---|
| 3,227,137 A | 1/1966 | Goldman et al. |
| 3,826,229 A | 7/1974 | Classe et al. |
| 3,831,557 A | 8/1974 | Elesh |
| 3,978,818 A | 9/1976 | Heldenbrand |
| 4,308,825 A | 1/1982 | Stepanian |
| 4,312,295 A | 1/1982 | Harrington |
| 4,615,300 A | 10/1986 | McDonough |
| 4,723,510 A | 2/1988 | Skillestad |
| 5,038,721 A | 8/1991 | Ouellette et al. |
| 5,062,392 A | 11/1991 | Lavash |
| 5,207,772 A | 5/1993 | Lauretta et al. |

*Primary Examiner*—Thomas Price

(57) ABSTRACT

An animal litter box liner of flexible, sheet-like material is provided with holes of an appropriate size and location for allowing clean, dry litter to sift therethrough while simultaneously retaining clumps of urine-soiled litter and feces within the liner as it is lifted from a litter pan.

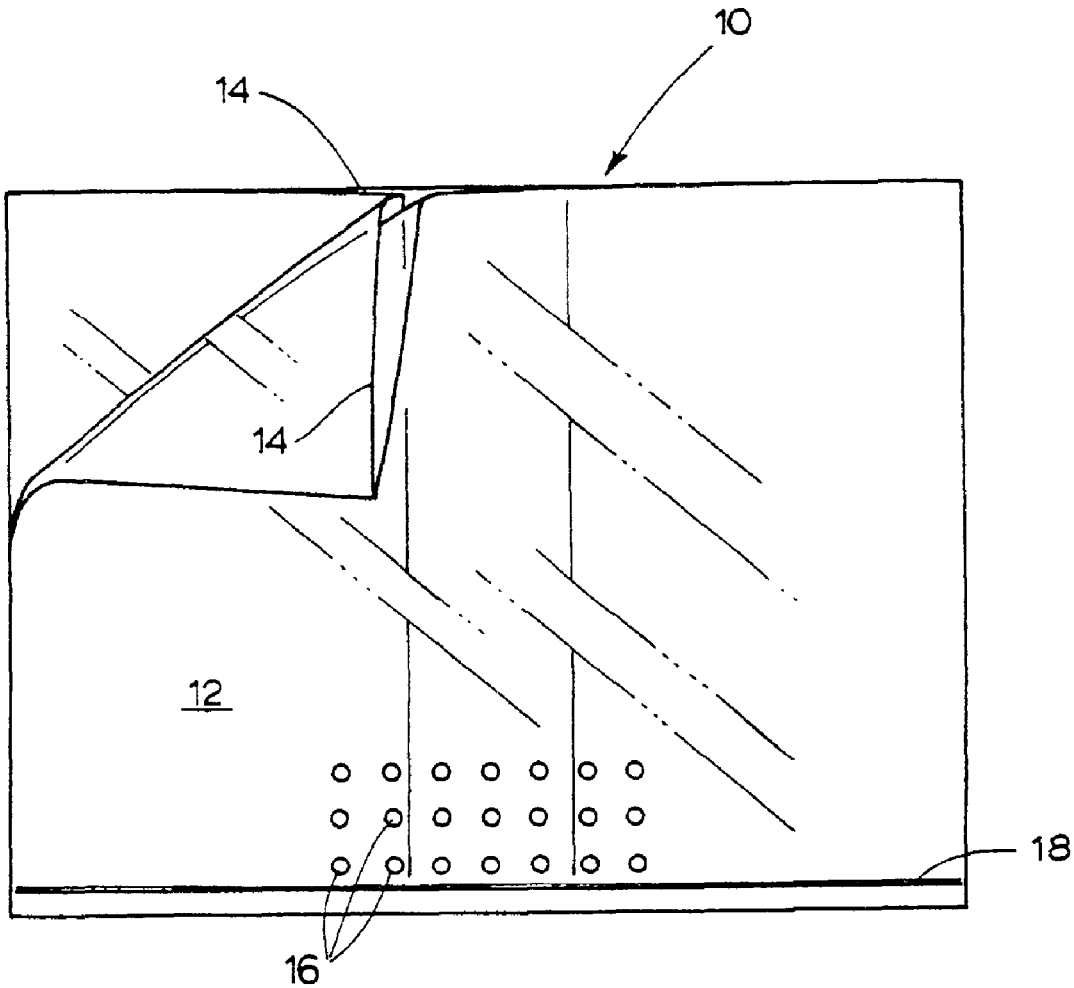

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 15 and 16 is confirmed.

Claims 1–14 and 17 are cancelled.

* * * * *